Fig. 1

INVENTORS
GEORGE C. PEARCE
JESSE L. EVANS
MILLARD E. FRY
FRANK L. MILBURN
BY Frederick M. Ritchie
THEIR ATTORNEY

Fig. 2

INVENTORS
GEORGE C. PEARCE
JESSE L. EVANS
MILLARD E. FRY
FRANK L. MILBURN
BY Frederick M Ritchie
THEIR ATTORNEY Nov. 17, 1964

G. C. PEARCE ETAL 3,157,176

COOKING RANGE

Filed March 31, 1960

INVENTORS
GEORGE C. PEARCE
JESSE L. EVANS
MILLARD E. FRY
FRANK L. MILBURN
BY Frederick M. Ritchie
THEIR ATTORNEY Nov. 17, 1964  G. C. PEARCE ETAL  3,157,176
COOKING RANGE
Filed March 31, 1960  9 Sheets-Sheet 8

INVENTORS
GEORGE C. PEARCE
JESSE L. EVANS
MILLARD E. FRY
FRANK L. MILBURN
BY Frederick M. Ritchie
THEIR ATTORNEY Nov. 17, 1964  G. C. PEARCE ETAL  3,157,176
COOKING RANGE Filed March 31, 1960  9 Sheets-Sheet 9

INVENTORS
GEORGE C. PEARCE
JESSE L. EVANS
MILLARD E. FRY
FRANK L. MILBURN
BY Frederick M. Ritchie
THEIR ATTORNEY United States Patent Office
3,157,176
Patented Nov. 17, 1964

3,157,176
COOKING RANGE
George C. Pearce, Dayton, Jesse L. Evans, Tipp City, Millard E. Fry, Dayton, and Frank L. Milburn, Bellbrook, Ohio, assignors to General Motors Corporation, Detroit, Mich., a corporation of Delaware
Filed Mar. 31, 1960, Ser. No. 19,082
28 Claims. (Cl. 126—37)

This invention relates to a domestic appliance and more particularly to an improved free-standing countertop cooking range having a built-in appearance.

The evolution of built-in cooking appliances has resulted in a great number of different appliances designed for different cooking operations. For instance, there are built-in ovens and built-in cooking tops. It has long been recognized in the art that an integral unit wherein the oven and surface cooking units are combined provides a more economical and efficient cooking unit. In order to satisfy the public's demand for appearances of the built-in type in a product which is efficient, utilitarian and economical, it is the general purpose of this invention to provide an improved new type free-standing range.

Accordingly, it is an object of this invention to provide a forty-inch free-standing countertop-mounted range embodying both oven and surface cooking units.

A further object of this invention is embodied in the provision of a range with an upper control compartment, a lower concealably mounted surface cooking unit drawer and an intermediate oven compartment.

It is also an object of this invention to provide the cooking top of a range with slidably removable and concealable surface cooking units.

A further object of this invention is the provision of a cover for a cooking top having slidably removable surface cooking units, wherein said cover is connected for simultaneous movement with said cooking units to conceal said cooking units in one cover position and to serve as a backsplash for said cooking units in another position.

An advantage of this invention lies in the fact that the cover for a cooking top, while concealing said cooking units, lies in complete coplanar relationship to the countertop in which the cooking top is installed.

It is also an object of this invention to provide a freestanding range with an over compartment overlying a surface unit compartment and wherein the door for such overlying oven is vertically liftable.

It is also an object of this invention to provide a door construction for a wall oven wherein the door is vertically liftable to expose said wall oven and wherein said door construction is provided with a latch assembly for releasing the door to a dropped position for cleaning the inner panel of the door.

It is also a provision of this invention to facilitate cleaning of an oven by providing said oven with removable shelf guides.

Further objects and advantages of the present invention will be apparent from the following description, reference being had to the accompanying drawings wherein preferred embodiments of the present invention are clearly shown.

In the drawings:

FIGURE 17 is a fragmentary sectional view taken along line 18—18 in FIGURE 2.

Figure 1:
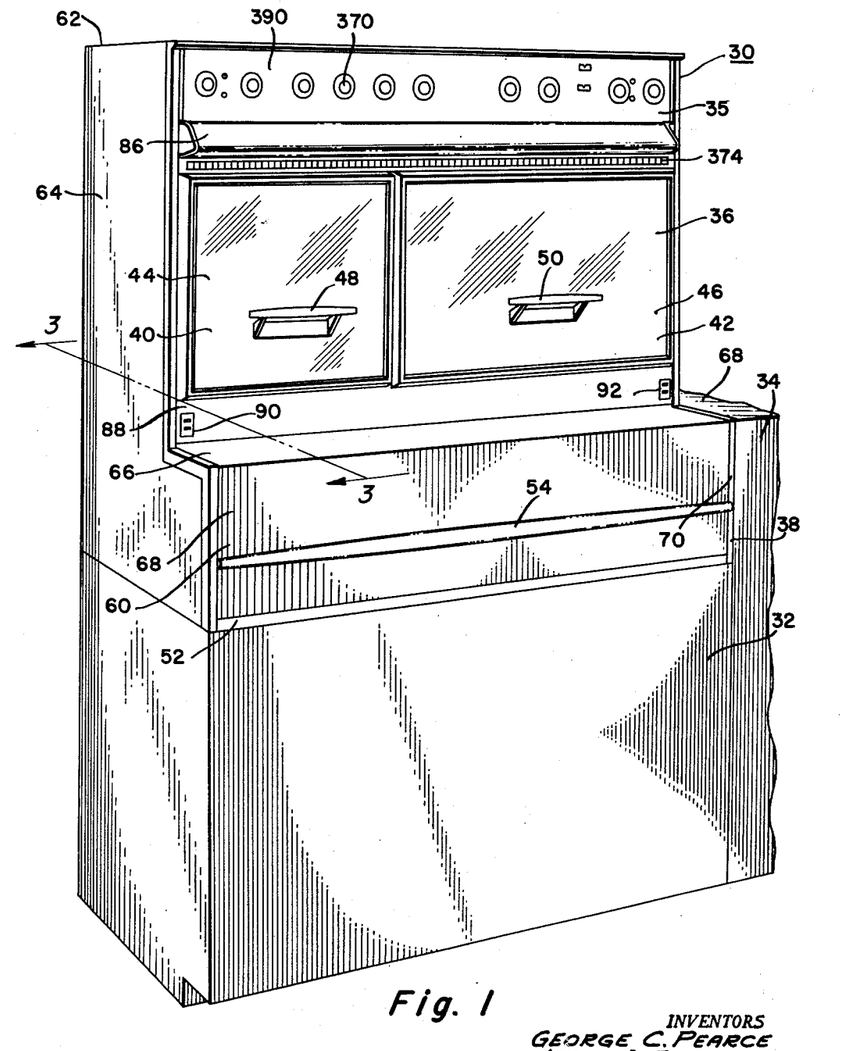
FIGURE 1 is a perspective view of this invention mounted in abutting or coplanar relationship to a line of base cabinets.

In accordance with this invention and with reference to FIGURES 1 and 2, a general description of this invention will be given. A range 30 is adapted to be installed above the floor level on a base cabinet 32 in a line of countertop or base cabinets 34 to give the range 30 a built-in appearance. It is also within the purview of this invention to hang the range 30 on a vertical wall without the supporting base cabinet 32. The range may be supplied from any conventional power source such as a wall receptacle behind the range. Thus, the range 30 will provide a built-in appearance while combining all of the cooking functions into one integral unit.

This wall hung type range 30 is comprised of a control section or compartment 35, an oven section or compartment 36 and a surface cooking unit compartment or burner section 38. Within the oven compartment 36 there is a small oven 40 and a relatively larger oven 42. The small oven 40 is closed by a vertically liftable door 44 which is shown in its CLOSED position in FIGURE 1 and in its raised or OPEN position in FIGURE 2. A larger oven door 46 is adapted to close the front of the oven 42 and is shown in its CLOSED position in FIGURE 1 and in the BROIL position in FIGURE 2. Note that the door 44 may be opened by grasping a handle 48 and lifting upwardly. Similarly, the door 46 may be manipulated by a handle 50. Such vertical door action provides maximum utensil clearance and minimizes overall range heighth.

Residing within the cooking unit compartment 38 is a drawer 52 having a transversely extending handle 54 for slidably withdrawing the drawer. A plurality of drawer mounted cooking units, such as 56, are installed on a top surface 58 of the burner drawer. Cooperating with this burner or cooking top drawer 52 is a generally L-shaped cover member or shield 60, which serves to conceal the cooking units 56 when they are slidably placed in their stored position (FIGURE 1) and which serves also as a back splash during cooking operations when the cooking units 56 are exposed (FIGURE 2). Although greater detail re the cooking unit drawer and its cover will be given hereinafter, suffice it at this time to note that the drawer 52 and the cover 60 move simultaneously—the cover 60 receding into the range 30 while the burner drawer 52 is being withdrawn and vice versa.

The control section 35, the ovens 40 and 42 and the surface cooking unit drawer 52 are all housed in a casing 62 which is provided with side panels 64 adapted for placement into abutting relationship with adjacent structures, such as the base cabinets 34. Note that when the range 30 is installed within a line of base cabinets 34, a top wall 66 of the burner cover 60 lies in coplanar relationship with the countertop 68 of the base cabinets 34. Similarly, a front wall 68 of the L-shaped cover 60 lies in coplanar relationship with the front wall of the base cabinet 34. Thus, the outer configuration of the wall range 30 lends itself to a built-in appearance when installed in a line of floor mounted kitchen cabinets. Note also that a frontward extension or cheekplate 70 of the side wall 64 provides a shield or buffer panel between the cooking top and the base cabinets to retain any cooking spatter with the range.

Figure 2:
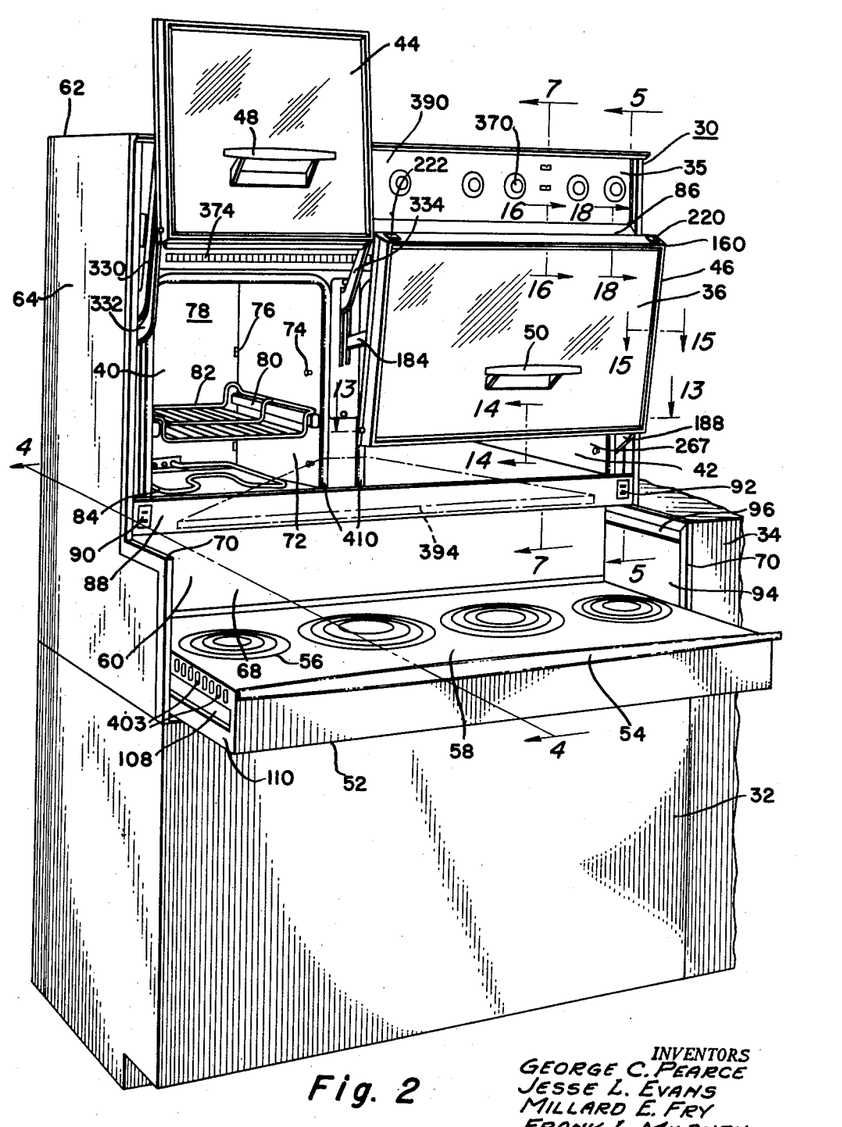
FIGURE 2 is a perspective view of this invention shown with left and right hand vertical lift doors in the raised position and the broil position respectively.

The construction of the oven interior is shown generally in FIGURE 2 wherein each side wall, such as 72, of oven 40 includes a plurality of studs 74 which cooperate with slots 76 in a rear wall 78 of the oven to support removable shelf guides such as 80. By simply slipping the shelf guide 80 from its stud and out of the rear wall slot the entire interior surfaces of the oven are exposed for cleaning. A plurality of oven racks, such as 82, may be slidably disposed upon the shelf guides 80. A bake heating element 84 may be positioned in the bottom of the oven 40 opposite a conventional top mounted broil heating element, not shown in FIGURE 2.

To enhance the convenience and utility of the range appliance 30 a lamp housing 86 (FIGURE 1) is positioned above the ovens 40 and 42 and designed in a manner that its light will show downwardly into the oven and upwardly to illuminate the control section 35. A door seal mullion 88 is interposed between the oven compartment 36 and the burner compartment 38 and carries a pair of electrical convenience outlets 90, 92 which may be controlled automatically from the control section 35.

Figure 3:
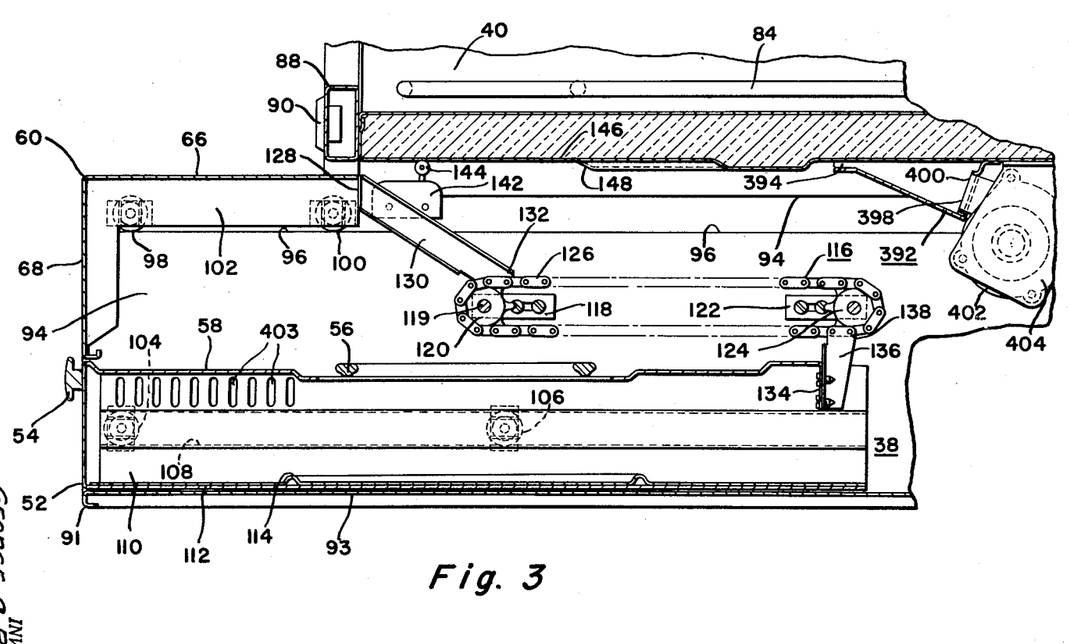
FIGURE 3 is a fragmentary sectional view taken along line 3—3 in FIGURE 1.
Figure 4:
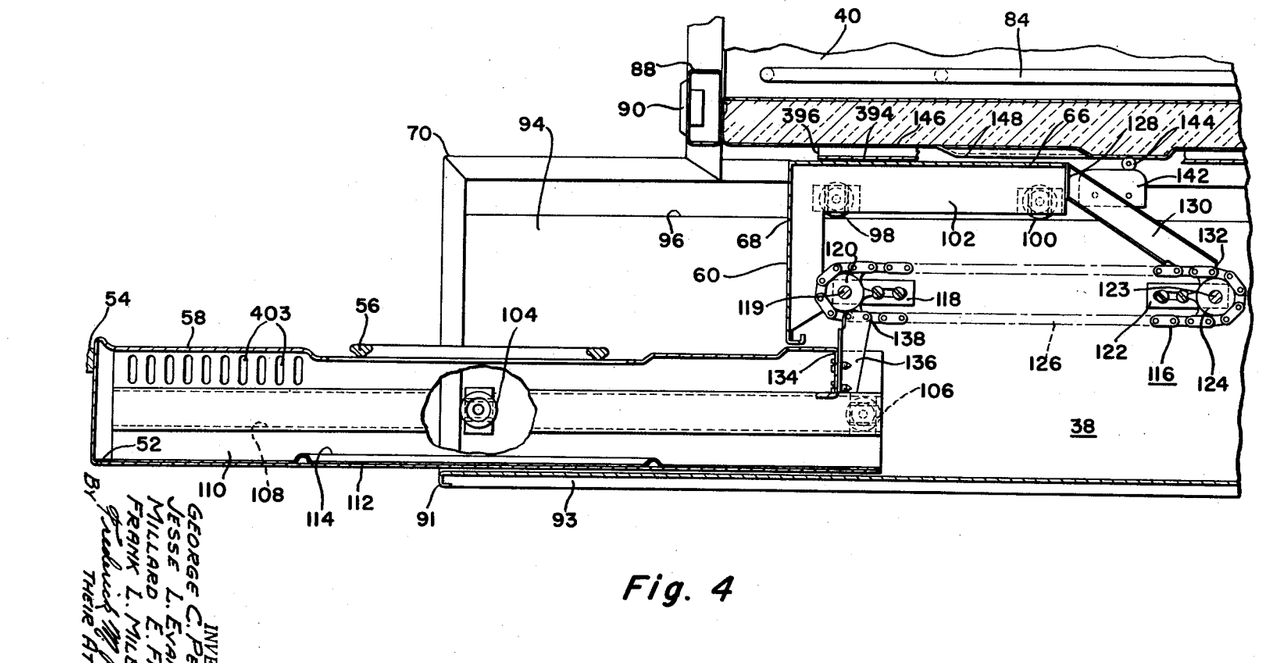
FIGURE 4 is a fragmentary sectional view taken along line 4—4 in FIGURE 2.

With reference to FIGURES 3 and 4, the concealable, slidable mounting arrangement for the surface cooking unit drawer 52 will now be explained. The range casing 62 encloses and is fastened to a large U-shaped bottom ribbed strengthening or reinforcement pan 91, which has a bottom wall 93 extending under the burner drawer 52 and sidewalls, such as 94, on each side of the burner drawer which lay in juxtaposition to and interfit with the cheek plate extensions 70 to provide rigidity thereto. Each sidewall 94 of the U-shaped bottom pan 91 is formed with a guide channel or track 96 for supporting a pair of cover support rollers 98, 100 attached to a side flange 102 depending from the top surface 66 of the cover 60. A pair of drawer support rollers 104 and 106 are rotatably attached to each sidewall 94 of the pan 91 to roll in a channel 108 depressed inwardly in a sidewall 110 on each side of the burner drawer 52. In addition to the drawer side walls 110 and the top cooking surface 58 the cooking unit drawer 52 is constructed in a boxlike configuration with a bottom wall or panel 112 which may be reinforced as by a ribbing 114. The rib 114 may be annular to form a receptacle area beneath each cooking unit 56 as a means of catching droppings through the cooking unit openings.

Simultaneous oppositely directed movement of the drawer 52 and the cover 60 is provided through a roller chain assembly 116. On each side wall 94 of the bottom support pan 91 there are mounted adjustably a front sprocket bracket 118 carrying the shaft 119 for a front sprocket 120 and a rear sprocket bracket 122 carrying the shaft 123 for a rear sprocket 124. Rotatably affixed to the freely rotatable sprockets 120 and 124 is a roller chain 126. The top wall 66 of the cover 60 has a rearwardly down-turned flange 128 from which a cover support bracket 130 extends to a position adjacent the roller chain 126 where it is attached as at 132. Similarly, the top wall or surface 58 of the cooking unit drawer 52 has a down-turned flange 134 to which is secured a drawer support bracket 136. This bracket 136 extends into engagement at 138 with the roller chain 126 in a diametrically opposite position from the attachment position 132 for the cover bracket 130. Thus, it may be seen that a withdrawing action of the cooking unit drawer 52 from the range casing 62 will cause the burner cover 60 to move inwardly under the oven compartment, thereby exposing the burners or cooking units 56. Note also that in the burner exposed position of FIGURE 4 the front wall 68 of the cover 60 serves as a back splash to cooking operations performed on the drawer. It should be further noted that a roller chain assembly 116 is provided on each side of the burner drawer 52 so that the drawer is supported equally at both sides thereof. For this purpose the sprocket shafts 119 and 123 extend transversely across the burner compartment 38 and are journaled at the opposite sidewall 94 of the support pan 91. Additional detail re this cover-drawer arrangement is set forth in our copending application S.N. 19,081, filed March 31, 1960.

On one side of the cover 60 an interlock switch 142 may be attached to the cover bracket 130. The switch 142 is provided with a roller-tipped actuator button 144 which rides on the bottom of an insulation retainer 146 disposed thereabove. The insulation retainer 146 is recessed or embossed as at 148 to provide a camming action to the switch actuator 144. With the actuator 144 extended the burners 56 may not be energized as seen in FIGURE 3 when the drawer 52 is in a stored position within the burner compartment 38. When the drawer 52 is withdrawn, the switch actuator 144 is cammed downwardly to energize the cooking unit 56.

It is within the purview of this invention to eliminate the cover roller track 96 so that the cheek plate extensions 70 may be made more rigid. In this situation the cover 60 may be provided with rollers at the bottom or lower end of the front wall 68 so that the rollers may glide on the top surface 58 of the drawer. This construction is also seen more particularly in our copending application set forth hereinbefore.

Figure 16:
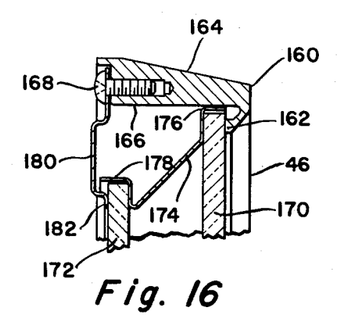
FIGURE 16 is a fragmentary sectional view taken along line 16—16 in FIGURE 2.
Figure 17:
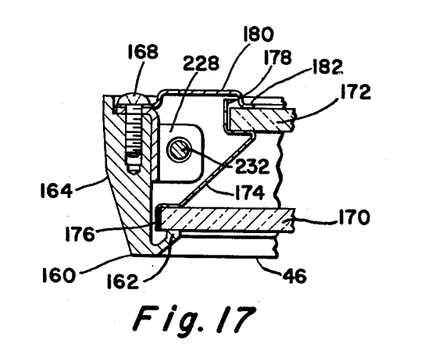
FIGURE 17 is a fragmentary sectional view taken along line 17—17 in FIGURE 11.
Figure 18:
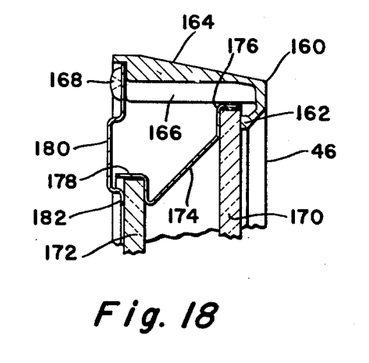

The door construction utilized in this invention is particularly adapted to the oven over burner type range 30. A lifting action is used to open the oven doors 44, 46 to an out-of-the-way location. Convenience is further enhanced by glass panels in the doors so that the user may see through the doors into the oven. With reference to FIGURES 2, 13, 14, 15, 16 and 18, the details of the door construction will now be set forth. Although the explanation will be directed to the door 46 for the large oven 42, it is to be understood that a similar construction is utilized for the small oven door 44. FIGURES 2 and 16 show the door 46 to be comprised of a die cast rectangular door frame 160 which has a front glass panel support flange 162, a peripheral edge 164 and a plurality of spaced inwardly extending attachment protuberances or bosses 166 for receiving a trim panel fastening means such as screw 168. A front glass panel 170 is positioned in abutting relationship to the casing support flange 162. A rear glass panel 172 is spaced from the front glass panel 170 by a spacer 174 which is provided with a front glass retainer portion or shoulder 176 and a rear glass retainer portion or shoulder 178. To hold the front and rear glass assembly within the door casing 160 an inside trim panel or retainer frame 180 is affixed by the fastening means 168 to the inner edge of the casing 160 about the periphery of the door. The radially inner edge flange 182 of the retainer 180 biasingly abuts the inner glass panel 172 and holds the glass assembly within the door 46. FIGURE 18 is another sectional view showing the door casing 160 and one of its integral bosses 166 to which the rectangular trim frame or retainer 180 is attached.

Figure 10:
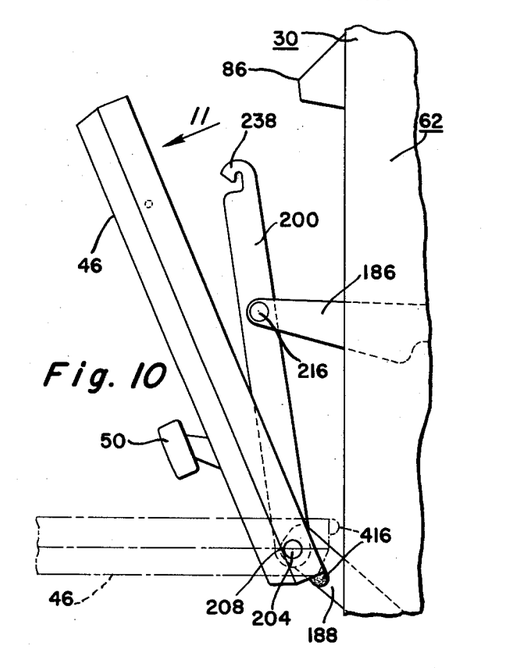
FIGURE 10 is a fragmentary elevational view showing the oven door of this invention unlatched from its control linkage.
Figure 11:
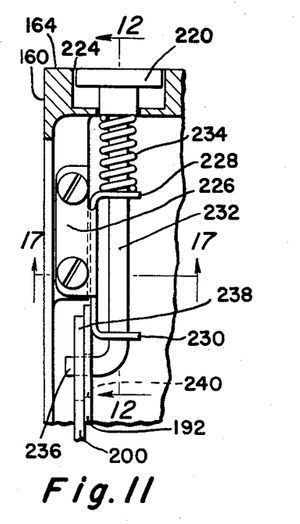
FIGURE 11 is a fragmentary sectional view taken in the direction of arrow 11 in FIGURE 10.
Figure 12:
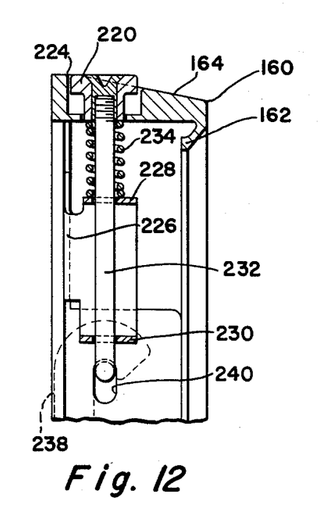
FIGURE 12 is a fragmentary sectional view taken along line 12—12 in FIGURE 11.

Although the counterbalancing arrangement for the doors 46 and 44 will be explained more fully hereinafter, it should be noted (FIGURES 2 and 10) that the door 46 is supported on one side thereof by an inside upper control arm or link 184 and on its opposite side by an outside upper control arm or link 186 and an outside lower control arm or link 188, all of which may be nylon coated. This three point support for the oven door 46 wherein the lower inside corner of the door is not directly supported requires a novel torque rod arrangement in the bottom of the door which is best understood with reference to FIGURES 13 and 14. The door frame 160, in addition to its peripheral edge 164, is cast with a pair of side flanges or webs 190 and 192 which are spaced inwardly from the outer peripheral edge 164 to form a cavity 194 and 196 for receiving a pair of latch arms 198 and 200, respectively. The latch arms 198 and 200 are affixed as by welding to opposite ends of a torque rod 202 which extends transversely through the bottom of the door casting 160. The ends of the torque rod 202 are tapped to receive a control arm mounting bolt 204, 206 which extend, respectively, through openings 208 and 210 in the outer peripheral edge 164 of the door casting. The bolt 204 is provided with a shoulder 212 on which the lower control arm 188 is relatively rotatably mounted. The action of the torque rod 202 in conjunction with the single inside control arm 184 and the outside control arms 186 and 188 is effective to provide sufficient rigidity to the door 46 in its movement between closed, broil and open position. The door frame side cavity 196 is seen again in FIGURE 15, the section taken above the torque rod 202 to show the upper control arm 186 pivotally fastened to the latch arm 200 by a shouldered bolt 216.

Figure 13:
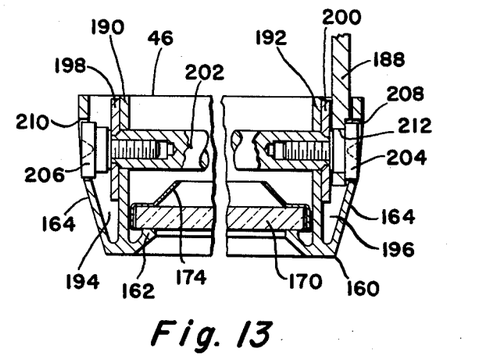
FIGURE 13 is a fragmentary sectional view taken along line 13—13 in FIGURE 2.

In conjunction with the vertically liftable door 46 of this invention, it is desirable to provide a means for facilitating cleaning of the inner glass panel 172. For this reason a latch assembly has been provided which the user may manipulate in accordance with his desire for cleaning access to the inner side of the door. Details relative to this latching arrangement are best seen in FIGURES 2, 10, 11, 12 and 17. In each corner of the oven door frame 160 is a latch actuator button 220, 222. The details of each are essentially the same. In view thereof the explanation will be given in connection with the latch assembly at the right hand of the oven door 46. Thus, the peripheral edge flange 164 of the door frame 160 is provided with an opening 224 through which the actuator button 220 projects. A door latch bracket 226 is affixed to the door frame 160 and formed to define a pair of flanges 228, 230 for slidably supporting a latch bolt or rod 232. Between the upper bracket flange 228 and the door frame 160 is a spring 234 for biasing upwardly the actuator button 220, the rod 232, and thus an integral bent over portion 236 into a hooked or notched latch end 238 of the latch arm 200. The bent over end 236 of the rod 32 extends through an opening 240 in the door casing inner web flange 192 to engage the latch arm hook end 238. When the actuator button 220 is depressed, the bent-over end 236 is moved out of engagement with the hook end 238 of the latch arm and the door 46 may be pivoted about the torque rod to its phantom line position of FIGURE 10. FIGURE 13 illustrates that the cavity 196 opens onto the bottom side of the door frame 160 to form a slot for receiving the end of the control arm 188 as the door is pivoted downwardly.

Figure 5:
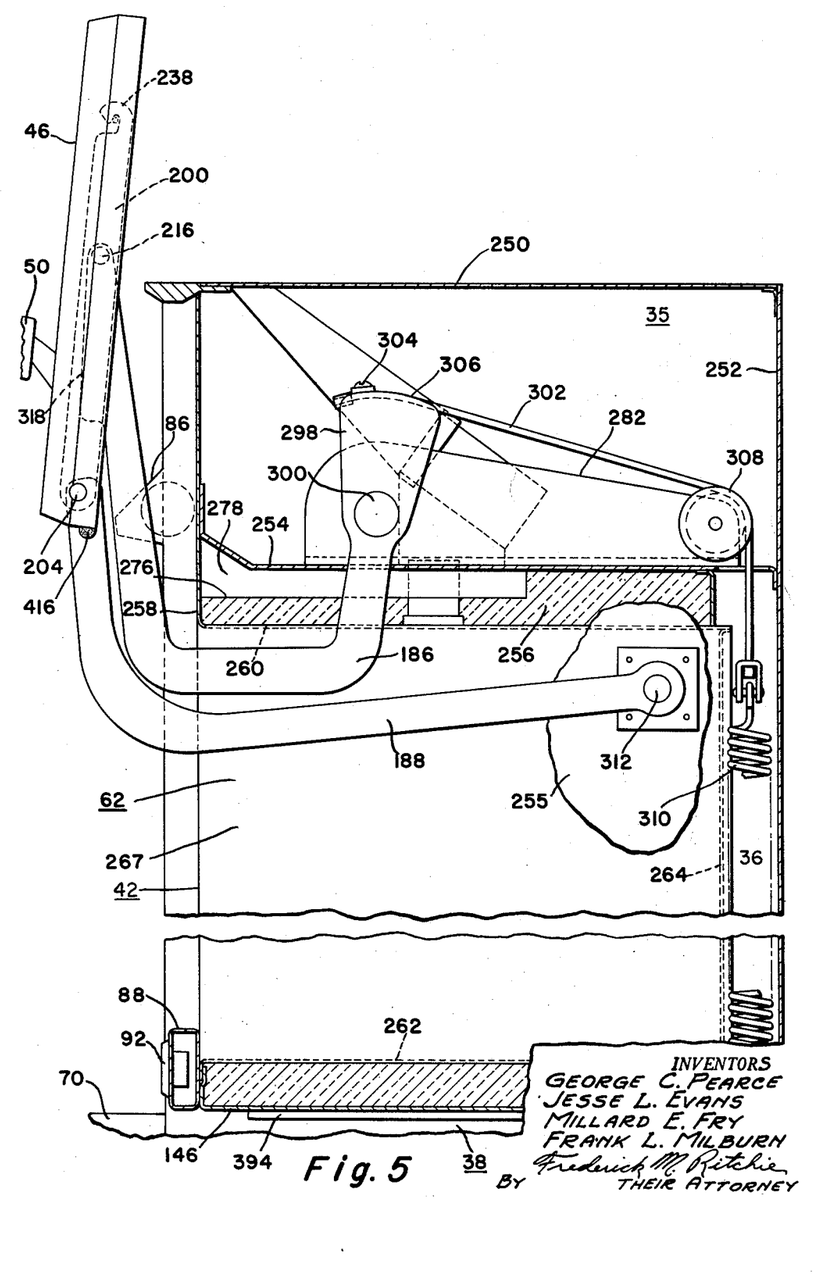
FIGURE 5 is a fragmentary sectional view taken along line 5—5 in FIGURE 2 to show the oven door in a raised position.
Figure 6:
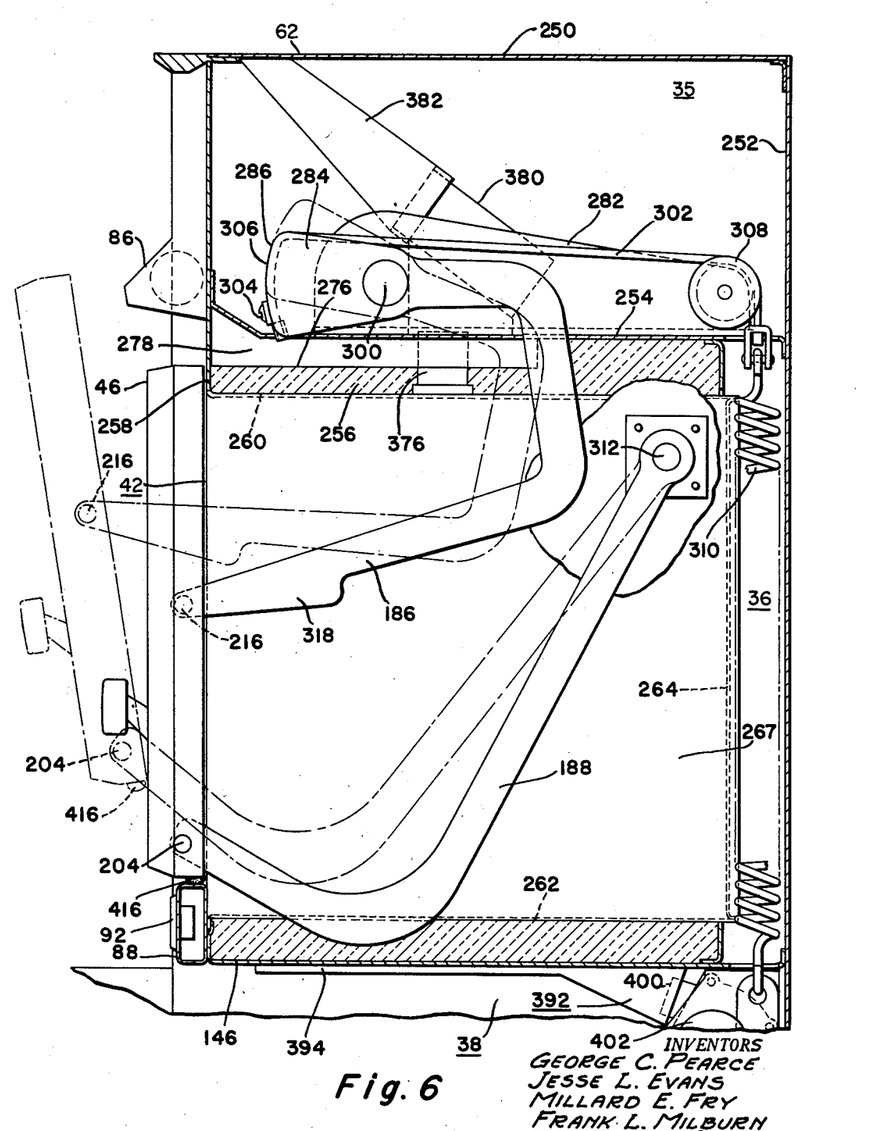
FIGURE 6 is a fragmentary sectional view taken along line 5—5 in FIGURE 2 to show the oven door in a closed and a broil position.
Figures 7, 8, 9:
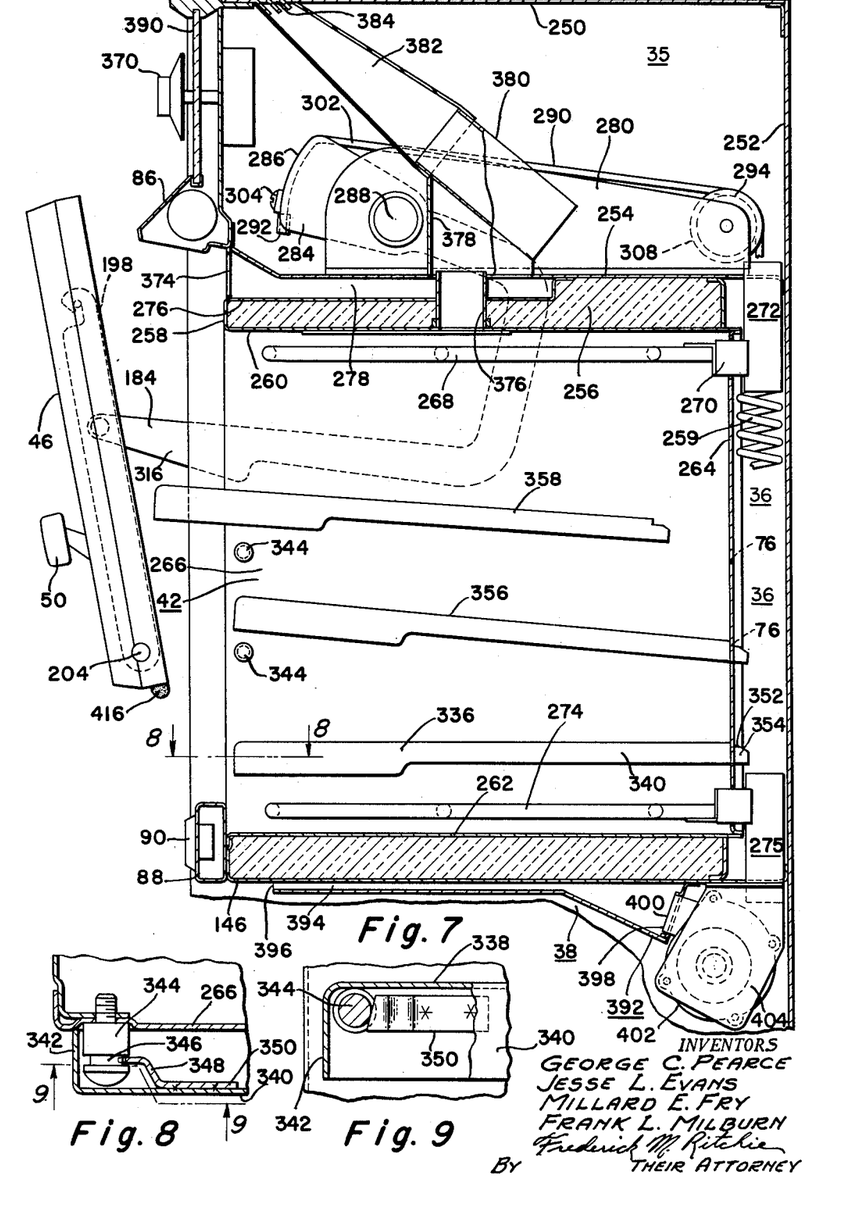
FIGURE 7 is a fragmentary sectional view taken generally along line 7—7 in FIGURE 2 and showing shelf guides in various stages of removal.
FIGURE 8 is a fragmentary sectional view taken along line 8—8 in FIGURE 7.
FIGURE 9 is a fragmentary sectional view taken along line 9—9 in FIGURE 8 with parts broken away.

FIGURES 5, 6 and 7 will now be referred to for setting forth the door linkage and counterbalance arrangement of this invention. The range casing 62 is provided with a removable top wall 250 and a rear wall insulation retainer 252. An upper insulation container and control compartment partition 254 cooperates with the lower insulation container 146 and side retainers such as 255 (FIGURE 5) to position insulation 256 about the oven liners such as 258 for each oven 40 and 42. The oven liner 258 is defined by a top wall 260, a bottom wall 262, a rear wall 264 and sidewalls 266, 267. A broil heating element 268 is supported at the top of the oven liner where its terminal end 270 extends into electrical engagement with a terminal block 272 in the insulation space to the rear of the oven liner. Overlying the bottom wall 262 of the oven liner is a bake heating element 274 which is similarly electrically engaged with a bake unit terminal block 275. A transverse air duct partition 276 is interposed between the control compartment 35 and the oven compartment 36. This partition 276 is attached to the underside of the insulation retainer 254 to provide an oven venting duct 278, as will be described more fully hereinafter. Supported on the partition 254 on the inside of each oven 40 and 42 is a door mounting bracket 280 (FIGURE 7). A similar door mounting bracket 282 is affixed to the partition 254 at the outside of each oven 40 and 42 (FIGURE 6). At one end of the upper control arm 184 is a fixed sector shaped portion 284 having an arcuately formed sector edge 286 pivotally mounted on a shaft or stud 288 on the front end of bracket 280. Thus, the upper control arm 184 for the inner side of the door 46 may be pivotally movable about the pivot point 288 on the support bracket 280. A flexible bond or cable 290 has one end 292 affixed to the sector edge 286 of the control arm 184 and extends over a pulley 294 pivotally mounted on the rear end of the mounting bracket 280. The bond or cable 290 extends into the insulation space at the rear of the liner 258 where it engages a coil spring 259, as will be understood more fully in connection with the mounting arrangement for control arm 186.

At the outside of the oven door 46 the control arm 186 (FIGURES 5 and 6) is provided with a sector portion 298 similar to 284 on the opposite arm 184. The bracket 282 pivotally mounts the upper control arm 186 on the shaft 300, and a flexible bond or cable 302 is affixed at 304 to an arcuate peripheral edge portion 306. The cable 302 extends from the sector portion 298 over a pulley 308 pivotally mounted at the rear of bracket 282 and into engagement with a counterbalance spring 310. Both the upper control arm 186 and the lower control arm 188 extend into the space between the outer sidewall insulation retainer 255 and the outer casing of the range. The lower arm 188 is pivotally connected as at 312 to the insulation retainer 255. The counterbalance arrangement of this invention relies on the changing moment arm vertically between the cables 290 and 302 and the shafts 288 and 300, respectively, in conjunction with the springs 259 and 310, respectively. The counterbalancing thus afforded permits the door 46 to be positioned in its closed position, shown in solid in FIGURE 6; its broil position, shown in phantom in FIGURE 6 and in solid in FIGURE 7; and its raised or open position in closely spaced blocking relationship to the front of the control section, shown in FIGURE 5.

The upper control arms 184 and 186 are formed with extensions 316 and 318, respectively, which nest between the inner webs 190 or 192 and the peripheral edge 164 of the door casing 160. (This nested arrangement in the instance of upper control arm 186 being shown in FIGURES 5 and 15.) Sidewise stability is provided by the extensions 318 and 316 so that the door 46 will have minimum side sway.

As aforesaid, the door 44 for the small oven is hingedly mounted and counterbalanced in the same manner as is the door 46. The only difference is in the positioning of the control arms. Door 44 has its upper control arm 330 and its lower control arm 332 (FIGURE 2) on the left side of the door whereas the single control arm 334 is carried on the right-hand side of oven door. In the case of either door 44 or 46, the counterbalancing arrangement is the same with the exception of the springs, such as 259 and 310, which are selected in accordance with the weight of the door.

The entire design of range 30 is compatible with a desire for accessibility in cleaning the components of the range. In line therewith the ovens 40 and 42 are provided with removable shelf guides, such as 80 in use on the right-hand side of oven 40. With reference to FIGURE 7, a left-side shelf guide 336 is shown installed on the side-wall 266 of oven 42. Each shelf guide is provided with a top wall or flange 338 and a sidewall or flange 340. A front wall 342 serves to conceal a stud 344 mounted in the sidewall 266 of the oven liner. The stud 344 is formed with an annular groove 346 which receives a resilient end 348 of a spring member 350 welded to the sidewall 340 of the shelf guide. At the rear wall 264 of the oven liner a slot 352 is provided for receiving a tab or extension 354 on the sidewall 340 of the shelf guide. The shelf guide 336 is shown in position to receive a rack, such as 82 (FIGURE 2), whereas shelf guide 356 is shown with its front end raised from the stud and ready for removal. On the other hand, shelf guide 358 is fully removed from a slot such as 76 in the rear wall 264 of the oven liner and is ready for removal from the oven, thereby exposing the entire surface of the oven sidewalls for cleaning.

Although the foregoing construction provides a complete integral wall type range, it is a desirable modification to provide a ventilating system, as will be described next following. With reference to FIGURES 1, 2 and 7, there is seen two venting systems—an oven ventilating system above the oven compartment 36 and a surface cooking unit vent system disposed between the oven compartment and the burner compartment 38.

One of the problems which the oven venting system is designed to overcome is overheating of control knobs, such as 370, on the control compartment 35. When the oven door 46 is in the broil position, shown in FIGURE 7, the super-heated air which flows over the lamp housing 86 may cause the knob 370 to become uncomfortable to the touch. For this reason the conduit or duct 278 is formed between the insulation retainer 254 and the duct partition 276. The duct 278 is somewhat fan shaped so that its inlet end may be positioned adjacent a transverse inlet grill 374. The oven 42 has a bake exhaust conduit 376 disposed in the top wall 260 of the oven liner 258. Thus, the fan-shaped conduit 278 and bake exhaust conduit 376 manifold into an inlet duct 378 which leads to an exhaust fan or blower 380. The outlet of the exhaust blower 380 may be conducted through any conventional exhaust duct 382 to an exhaust grill or outlet 384 on the top wall 250 of the range. This grill 384 may extend transversely across any portion of the range in order to provide sufficient dispersal of the hot gases exhausted.

It is within the purview of this invention to make the exhaust fan 380 responsive to the operation of the broil unit 268. Whenever the oven door 46 is in the position shown in FIGURE 7 and the broil unit 268 is energized, the blower or air impelling means 380 will be energized to cause the hot gases from the broiling operation to be drawn into the duct 278 through the grill 374 and, subsequently, through the fan to the outside by way of exhaust grill 384. When the door 46 is closed, as seen in FIGURE 6, the oven exhaust conduit 376 will serve to direct the baking fumes and odors through the deenergized blower 380 to the exhaust duct 382. It should also be noted that the exhaust duct 382 could be connected to the outside atmosphere such that the air impelling means or blower 380 could be used as an exhaust fan for the kitchen, using the grill 374 to withdraw kitchen odors into the exhaust system. The control system of this range may be adapted to energize the blower 380 whenever the broil unit in either oven is energized.

The surface cooking unit vent system is directed to another problem in the operation of a wall type range 30. Condensation may, under certain conditions, form on the oven doors 44 and 46 when a cooking operation is being performed on the exposed burners of FIGURE 2. For instance the steam rising from the utensils placed on the burners 56 may condense on the relatively cool surfaces of the oven doors and on the glass panel 390 of the control compartment 34. This rising heat may also raise the temperature of the oven door handles and the control knobs 370. It is therefore desirable to dilute and deflect the rising heat and steam away from the front surfaces of the oven compartment 36 and control compartment 35 and to accomplish these ends, a surface cooking unit blower system, shown generally at 392 (FIGURE 7) may be used. A fan-shaped conduit 394 is positioned just beneath the insulation retainer 146 and provided with an opening 396 which is directed between the insulation retainer 146 and the top wall 66 of the burner cover 60, as seen in FIGURE 4. The general configuration of the fan-shaped duct is seen in phantom in FIGURE 2 wherein the reduced end of the duct 394 is provided with an inlet 398 to receive the outlet end 400 of a blower 402. This blower may be positioned in any fashion as by suspension on a bracket 404 from the insulation retainer 146. With reference to FIGURE 4, the energization of the blower 402 will cause a relatively cool stream of air from behind the range to be directed from the outlet 396 of the duct in a direction normal to the rising heat and condensation from the burners 56. The force of this air stream is just enough to cause sufficient dilution to prevent condensation and to lower the temperature of the rising cooking gases. No substantial air currents should be noticed in front of the burner drawer. It should be understood that the blower 402 may be made energizable simultaneously with the energization of any of the surface cooking units 56. Ventilation of the burner drawer 52 is accomplished by means of louvres 403 in the sidewall 110 of the drawer.

Figure 14:
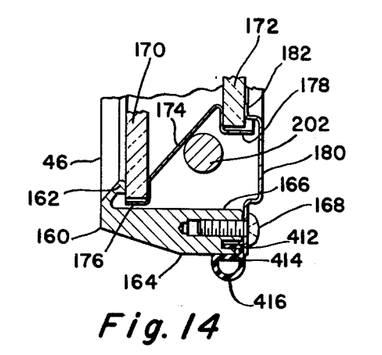
FIGURE 14 is a fragmentary sectional view taken along line 14—14 in FIGURE 2.
Figure 15:
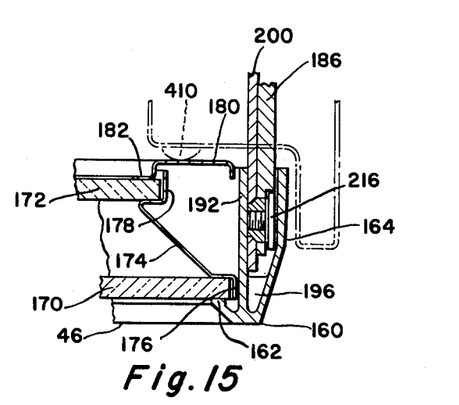
FIGURE 15 is a fragmentary sectional view taken along line 15—15 in FIGURE 2.

The sealing arrangement for the oven doors 44 and 46 may best be understood with reference to FIGURES 2 and 14. The side and top of the oven liner is sealed by an elastomeric, inverted U-shaped member 410 which circumscribes the front side and top walls of the liner. The door frame 160 has its peripheral edge 164 formed with a rearwardly directed slot 412 on the bottom side of the door. The slot 412 receives an attachment flange 414 of a door seal 416. When the door is closed, as seen in FIGURE 6, for instance, the seal 416 seats on the top of the door seal mullion 88. The seal arrangement is the same for either oven door 44 or 46.

It should now be seen that an improved wall type range construction has been provided which facilitates cleaning and cooking operations. A built-in appearance is constructed into a unitary range which embodies all of the normal cooking features now requiring several built-in appliances. A novel lift door arrangement is included to expose the interior of the oven for easy cleaning thereof together with a door latch arrangement so that the interior of the door may be easily exposed for cleaning. Shelf guides are made removable for clean uncluttered wall panels on the oven interior. A novel sliding cooking top is combined with a simultaneous but oppositely movable cover so that the range burners may be completely covered and the outer range configuration made coplanar with the cabinetry in which it is installed. Further, a ventilation system has been provided to eliminate smoke and odors and to maintain the front of the range cool and free of condensation at all times.

While the embodiments of the present invention as herein disclosed, constitute preferred forms, it is to be understood that other forms might be adopted.

What is claimed is as follows:

1. In combination; a casing enclosing a compartment having an opening; a door having a first vertically disposed position for closing said opening and a second generally vertically disposed position above said first position for exposing said opening; said door comprising a frame having an outer glass panel support flange, a peripheral edge flange and first and second side flanges spaced inwardly from said edge flange, an outer glass panel adjacent said support flange, an inner glass panel, a spacer retainer for spacing said glass panels, an inside retainer having an inner edge in juxtaposition to said inner panel and an outer edge secured to said peripheral edge flange, and a torque rod transversely positioned in said door and extending through said side flanges; a lower nylon coated control arm having one end pivotally connected to one end of said torque rod and another end pivotally connected to said casing; a first door latch arm between said first side flange and said edge flange and affixed to one end of said torque rod; a second door latch arm between said second side flange and said edge flange and affixed to the other end of said torque rod; at least one of said latch arms having a hook portion; a pair of upper nylon coated control arms each having one end pivotally connected to said casing and another end pivotally connected to said first and second door latch arms respectively above said torque rod; and a latch assembly having a latch bolt engaged with said hook portion, a door frame mounted latch bracket for slidably supporting said latch bolt, and a spring biased actuator exposed through said peripheral edge flange and connected to said bolt for disengaging said bolt from said hook portion, whereby said frame may pivot downwardly about said torque rod to expose said inner glass panel.

2. In combination; a casing enclosing a compartment having an opening; a door having a first vertically disposed position for closing said opening and a second generally vertically disposed position above said first position for exposing said opening; said door comprising a frame having an outer glass panel support flange, a peripheral edge flange and first and second side flanges spaced inwardly from said edge flange, an outer glass panel adjacent said support flange, an inner glass panel, a spacer retainer for spacing said glass panels, and an inside retainer having an inner edge in juxtaposition to said inner panel and an outer edge secured to said peripheral edge flange; a lower control arm having one end pivotally connected to said door between said edge flange and one of said side flanges and another end pivotally connected to said casing; a first door latch arm between said one of said side flanges and said edge flange and pivotally connected to said side flange coaxially with said one end of said lower control arm; a second door latch arm between the other of said side flanges and said edge flange and pivotally connected to the other of said side flanges; at least one of said latch arms having a hook portion; a pair of upper control arms each having one end pivotally connected to said casing and another end pivotally connected to said first and second door latch arms respectively above the pivotal connection of said latch arms to said side flanges; and a latch assembly having a latch bolt engaged with said hook portion, a frame mounted latch bracket for slidably supporting said latch bolt, and a spring biased actuator exposed through said peripheral edge flange and connected to said bolt for disengaging said bolt from said hook portion, whereby said frame may pivot downwardly to expose said inner glass panel.

3. In combination, a casing defining an upper compartment and a lower compartment, a partition between said compartments, an oven liner in said lower compartment having a front opening and having rear and side walls spaced from said casing, a generally vertically movable door for closing said opening, a door mounting bracket on said partition having a rearward end adjacent the juncture of said rear wall and said side wall and a frontward end extending toward said front opening, a pulley on said rearward end, first and second door mounting links supporting one side of said door, a third door mounting link supporting the other side of said door, said first link having an arcuately edged sector portion pivotally mounted to said frontward end of said bracket and a door mounting portion pivotally connected to said door, said second link having one end pivotally connected adjacent one of said side walls and another end pivotally connected to said door, said third link configured substantially like said first link and having one end pivotally connected to said oven door opposite said door mounting portion of said first link and another end pivotally connected to the casing, a spring connected to said casing behind said rear wall, and a flexible bond connected to said arcuately edged sector portion and extending over said pulley to engage said spring for counterbalancing said door.

4. The combination of claim 3 wherein said door includes means for releasing said door for horizontally pivotal movement about the pivotal point of connection of said second link with said door.

5. In combination, a casing defining an upper compartment and a lower compartment, a partition between said compartments, an oven liner in said lower compartment having a front opening and having rear and side walls insulatingly spaced from said casing, a door seal mullion attached adjacent said front opening, a generally vertically movable rectangular door for closing said opening, means for sealing between said door and said liner including an inverted U-shaped seal portion attached to said liner about the top and sides of said front opening and another seal portion attached to the bottom of said door and adapted to abut said mullion when said door is closed, a torsion rod positioned transversely along the bottom of said door, a pair of door mounting brackets on said partition each having a rearward end adjacent the juncture of said rear wall and each of said side walls and a frontward end extending toward said front opening, a pulley on each of said rearward ends, first and second door mounting links supporting one side of said door, a third door mounting link supporting the other side of said door, said first link being U-shaped and having an arcuately edged sector portion pivotally mounted to said frontward end of one of said brackets and a door mounting portion pivotally connected to said door, said door mounting portion having an extension projecting into said door when said door is moved upwardly to stabilize said door against lateral sway, said second link being L-shaped and having one end pivotally connected adjacent one of said side walls and another end pivotally connected to one end of said torsion rod, said third link configured substantially like said first link and having one end pivotally connected to said oven door opposite said door mounting portion of said first link and above said torsion rod and an arcuately edged sector portion pivotally connected to the frontward end of the other of said brackets, a pair of springs connected to said casing behind said rear wall, and a pair of flexible bonds connected respectively to said arcuately edged sector portions and extending over said pulleys to engage said springs respectively for counterbalancing said door.

6. The combination of claim 5 wherein said door includes means for rendering ineffective the pivotal connection of said first and third links to said door, whereby said door may pivot horizontally downwardly about said torsion rod.

7. In combination, a casing defining an upper compartment and a lower compartment, a partition between said compartments, an oven liner in said lower compartment having a front opening and having rear and side walls spaced from said casing, a generally vertically movable door for closing said opening, a torsion rod positioned transversely along the bottom of said door, a pair of door mounting brackets on said partition each having a rearward end adjacent the juncture of said rear wall and each of said side walls and a frontward end extending toward said front opening, a pulley on each of said rearward ends, first and second door mounting links supporting one side of said door, a third door mounting link supporting the other side of said door, said first link having an arcuately edged sector portion pivotally mounted to said frontward end of one of said brackets and a door mounting portion pivotally connected to said door, said second link having one end pivotally connected adjacent one of said side walls and another end pivotally connected to one end of said torsion rod, said third link configured substantially like said first link and having one end pivotally connected to said oven door opposite said door mounting portion of said first link and above said torsion rod and an arcuately edged sector portion pivotally connected to the frontward end of the other of said brackets, a pair of springs connected to said casing behind said rear wall, and a pair of flexible bonds connected respectively to said arcuately edged sector portions and extending over said pulleys to engage said springs respectively for counterbalancing said door.

8. In combination, a range adapted for installation in a countertop and comprising, a casing defining an upper control compartment having a front panel, an oven compartment and a surface cooking unit compartment, said oven compartment having a front opening below said front panel, a door having a first vertically disposed position for closing said opening and a second generally vertically disposed position above said first position and spaced in front of said front panel for exposing said opening, a surface cooking unit drawer for supporting a surface cooking unit and slidably movable from a position within said surface cooking unit compartment to a position outside of said surface cooking unit compartment, said surface cooking unit moving along a path in vertical alignment with said door and closely adjacent the bottom of said front opening, a cover interconnected with said drawer for simultaneous oppositely directed glideable movement, said cover having front and top walls for concealing said surface cooking unit when said drawer is in said position within said cooking unit compartment and for defining a coplanar surface with said countertop, and said cover exposing said surface cooking unit when said drawer is in said position outside of said surface cooking unit compartment, whereby said cover front wall forms a back splash for said surface cooking unit, said casing having a horizontal channel opening into said surface cooking unit compartment, and said cover having a pair of spaced rollers extending into said channel for supporting said cover.

9. A venting system for a range having a casing defining an upper control compartment having a front panel, a lower cooking unit compartment and an intermediate oven compartment having a front opening, a door for closing said opening, a cooking unit below said door in said cooking unit compartment, means on said front panel for controlling said cooking unit, a generally horizontally directed exhaust duct between said intermediate and lower compartments and having an outlet adjacent said cooking unit, and an air impelling means connected in air flow relationship to said exhaust duct for impelling relatively cool air over said cooking unit, said air impelling means operating in response to said controlling means to dilute the air over said cooking unit thereby to prevent condensation on said door and to decrease the heat at said controlling means.

10. In combination, means forming an oven compartment having an opening and an oven control panel above opening, a door for closing said opening and having a rear panel facing in the direction of said oven compartment, means including a control arm pivotally connected at one end in relatively fixed relationship to said oven compartment forming means and pivotally connected at its other end in relatively fixed relationship to said door for supporting said door for vertical movement between a fully open position above said oven compartment and in spaced relationship to said control panel and a closed position adjacent said oven compartment while said rear panel faces in substantially the same direction, and means for eliminating the relatively fixed relationship of said door with said other end of said control arm for partially releasing said door from said supporting means to facilitate facing said rear panel away from said oven compartment.

11. In combination, means forming an oven compartment having an opening and a control compartment above said oven compartment having an oven control panel above said opening, a door for closing said opening and having a rear panel facing in the direction of said oven compartment and exposed to the interior thereof, means for supporting said door between fully open and closed positions while said rear panel faces in substantially the same direction, said rear panel when said door is in said fully open position being in closely spaced relationship to said control panel, and means for releasing said door from said supporting means to facilitate facing said rear panel away from said oven compartment to increase the distance between said rear panel and said control panel.

12. The combination of claim 11 wherein said releasing means includes a manually operable actuator on said door.

13. The combination of claim 11 wherein said supporting means includes a latch arm pivotally connected at one end to said door and releasably connected to said releasing means at the other end thereof.

14. The combination of claim 13 wherein said latch arm has a hook portion at said other end and said releasing means includes a spring biased bolt selectively extendable into said hook portion.

15. In combination, means forming an oven compartment having an opening, a control compartment having a front panel above said opening and a surface cooking unit compartment below said oven compartment, a surface cooking unit mounted for slidable movement in and out of said surface cooking unit compartment, means on said front panel for controlling said surface cooking unit, a door in vertical alignment with the slidable movement of said surface cooking unit for closing said opening and having a rear panel facing in the direction of said oven compartment, and means for supporting said door between fully open and closed positions while said rear panel faces in substantially the same direction, said supporting means retaining said door in said fully open position in spaced relationship to said front panel to clear said controlling means.

16. A venting system for a range having a casing defining an upper control compartment having a front panel and an oven compartment having a front opening and a heating element, a generally vertically movable door having a lower position for closing said front opening and an upper position in front of said front panel when said front opening is opened, means on said front panel for controlling said heating element, means forming an intake duct between said upper compartment and said oven compartment and having an outside air inlet adjacent said front panel and overlying said front opening, said intake duct having an oven air inlet connected to said oven compartment, an exhaust duct in said upper compartment, and air impelling means connected in series air flow relationship to said intake duct and said exhaust duct, said air impelling means operating in response to said controlling means to divert air from said front panel.

17. A venting system for a range having a casing defining an upper control compartment having a front panel and an oven compartment having a front opening and a heating element, a generally vertically movable door having a lower position for closing said front opening and an upper position in front of said front panel when said front opening is opened, means on said front panel for controlling said heating element, means forming an intake duct above said oven compartment and having an outside air inlet adjacent said front panel and overlying said front opening, and air impelling means connected in series air flow relationship to said intake duct, said air impelling means operating to convey heat away from said front panel to prevent said controlling means from overheating.

18. A venting system for a range having a casing defining an upper control compartment having a front panel, a lower cooking unit compartment and an intermediate oven compartment having a front opening and a heating element, a generally vertically movable door having a lower position for closing said front opening and an upper position in front of said front panel for opening said front opening, a cooking unit below said door in said cooking unit compartment whereby heat rising from said cooking unit is channeled by said door towards said front panel, means on said front panel for controlling said cooking unit and said heating element, an exhaust duct between said intermediate compartment and said cooking unit compartment having an outlet adjacent said cooking unit, and an air impelling means connected in series air flow relationship to said exhaust duct for impelling air over said cooking unit, said air impelling means operating in response to said controlling means to divert heat from said front panel to prevent said controlling means from overheating.

19. A venting system for a range having a casing defining an upper control compartment having a front panel, a lower cooking unit compartment and an intermediate compartment having a front opening, a generally vertically movable door having a lower position for closing said front opening and an upper position in front of said front panel for opening said front opening, a cooking unit below said door in said cooking unit compartment whereby heat rising from said cooking unit is channeled by said door towards said front panel, means on said front panel for controlling said cooking unit, means forming a duct between said intermediate compartment and said cooking unit compartment having an opening adjacent said cooking unit, and an air impelling means connected in series flow relationship to said duct for impelling air over said cooking unit, said air impelling means operating to divert heat from said front panel to prevent said controlling means from overheating.

20. A venting system for a range having a casing defining an upper control compartment having a front panel and an oven compartment having a front opening and a heating element, a generally vertically movable door having a lower position for closing said front opening and an upper position in front of said front panel when said front opening is opened, means on said front panel for controlling said heating element, means forming an intake duct above said oven compartment and having an outside air inlet adjacent said front panel and overlying said front opening, and air impelling means connected in series air flow relationship to said intake duct, said air impelling means being selectively operable when said controlling means is operating to cause said heating element to heat said oven compartment thereby to convey heat away from said front panel to prevent said controlling means from overheating.

21. In combination, means forming a domestic oven compartment having an opening and a control compartment above said oven compartment, said control compartment having an oven control panel above said opening, means for heating in said oven compartment, means on said control panel for controlling said heating means, a door for closing said opening and having a rear panel facing in the direction of said oven compartment, means including a control arm pivotally connected at one end to said oven compartment forming means and at its other end to said door for supporting said door for vertical movement between a fully open position above said oven compartment and in closely spaced relationship to said control panel and a closed position adjacent said oven compartment while said rear panel faces in substantially the same direction, and means in said control compartment connected to said one end of said control arm for counterbalancing said door.

22. In combination, means forming a first compartment having an opening and a second compartment above said first compartment having a front panel above said opening, a door for closing said opening and having a rear panel facing in the direction of said first compartment and exposed to the interior thereof, means for supporting said door between fully open and closed positions while said rear panel faces in substantially the same direction, said rear panel when said door is in said fully open position being in closely spaced relationship to said front panel, and means for releasing said door from said supporting means to facilitate facing said rear panel away from said first compartment to increase the distance between said rear panel and said front panel.

23. In combination; a casing enclosing a compartment having an opening; a door having a first vertically disposed position for closing said opening and a second generally vertically disposed position above said first position for exposing said opening; said door comprising a frame having an outer glass panel support flange and a peripheral edge flange including an attachment portion, means forming first and second side flanges spaced inwardly from said edge flange, an outer glass panel adjacent said support flange, an inner glass panel, a spacer retainer for spacing said glass panels, and an inside retainer having an inner edge in juxtaposition to said inner panel and an outer edge secured to said attachment portion of said peripheral edge flange; a lower control arm having one end pivotally connected to said door between said edge flange and one of said side flanges and another end pivotally connected to said casing; a first door latch arm between said one of said side flanges and said edge flange and pivotally connected to said side flange and said one end of said lower control arm; a second door latch arm between the other of said side flanges and said edge flange and pivotally connected to the other of said side flanges; a pair of upper control arms each having one end pivotally connected to said casing and another end pivotally connected to said first and second door latch arms respectively above the pivotal connection of said latch arms to said side flanges; and a latch means including a first latch portion on at least one of said latch arms and a second latch portion extending from one of said side flanges into selective engagement with said first latch portion, and an actuator exposed adjacent said peripheral edge flange and connected to one of said latch portions for disengaging said one of said latch portions from the other of said latch portions, whereby said frame may pivot downwardly to expose said inner glass panel.

24. The combination of claim 23 including a seal fastened to said door and engageable with said casing when said door is in said first vertically disposed position.

25. In combination, a casing defining an upper compartment and a lower compartment, said upper compartment having a front panel, a partition between said compartments, an oven liner in said lower compartment having a front opening and having rear and side walls spaced from said casing, a generally vertically movable door having a lower position for closing said opening and an upper generally vertical position in closely spaced blocking relationship to said front panel for exposing said opening, a door mounting bracket means on said partition having a frontward end extending toward said front opening and including a shaft pivotable about an axis parallel to the plane of said door, first and second door mounting links supporting one side of said door, a third door mounting link supporting the other side of said door, said first link having a counterbalance portion pivotally mounted to said shaft at said frontward end of said bracket means and a door mounting portion pivotally connected to said door, said counterbalance portion having a radially outer edge portion movable through a plurality of stop portions in an arcuate path traced in a plane generally perpendicular to the said axis, said second link having one end pivotally connected adjacent one of said side walls and another end pivotally connected to said door, said third link configured substantially like said first link and having one end pivotally connected to said oven door opposite said door mounting portion of said first link and another end pivotally connected to the casing, a coil spring having one end connected to said casing adjacent said rear wall, and a flexible bond connected at one end in fixed relationship to said edge portion and movable therewith and at its other end to said coil spring for counterbalancing said door.

26. The combination of claim 25 wherein said door includes means for releasing said door for horizontally pivotal movement about the pivotal point of connection of said second link with said door.

27. A venting system for a range having a casing defining an upper control compartment having a front panel and an oven compartment having a front opening, a generally vertically movable door having a lower position for closing said front opening and an upper position in front of said front panel when said front opening is opened, controlling means on said front panel operable to condition said oven compartment for heating therein, means including a top portion of said door forming an intake duct between said upper compartment and said front opening of said oven compartment and having an outside air inlet adjacent said front panel and overlying said front opening, an exhaust duct from said oven compartment having an exhaust duct inlet lower than said outside air inlet, and air impelling means connected in series air flow relationship to said intake duct and said exhaust duct, said air impelling means operating in response to said controlling means to divert air from said front panel.

28. A venting system for a range having a casing defining an upper control compartment having a front panel, a lower cooking unit compartment and an intermediate oven compartment having a front opening, a generally vertically movable door having a lower position for closing said front opening and an upper position in front of said front panel for opening said front opening, a cooking unit below said door in said cooking unit compartment whereby heat rising from said cooking unit is channeled by said door towards said front panel, first controlling means on said front panel operable to condition said oven compartment for heating therein, second controlling means on said front panel operable to condition said cooking unit for heating, an exhaust duct between said intermediate compartment and said cooking unit compartment having an outlet adjacently overlying said cooking unit, and air impelling means having one portion connected in series air flow relationship to said exhaust duct for impelling air over said cooking unit and another portion connected in series air flow relationship to said oven compartment for drawing air from said oven compartment, at least one of said portions of said air impelling means operating in response to at least one of said first and second controlling means to divert heat from said front panel to prevent said first and second controlling means from overheating.

References Cited by the Examiner

UNITED STATES PATENTS

| | | | |
|---|---|---|---|
| 1,104,224 | 7/14 | Roy | 126—191 X |
| 1,612,730 | 12/26 | Keichline | 126—37 |
| 1,989,749 | 2/35 | Fullerton | 126—37 |
| 1,998,343 | 4/35 | Teller et al. | 126—339 |
| 2,011,189 | 8/35 | Anderson | 126—339 |
| 2,483,968 | 10/49 | Ecklund | 110—176 |
| 2,586,023 | 2/52 | Gillette | 126—21 |
| 2,634,718 | 4/53 | Williams | 126—21 |
| 2,938,516 | 5/60 | Saponara | 126—191 |
| 2,939,452 | 6/60 | Kamin | 126—190 |
| 2,972,036 | 2/61 | Pollock et al. | 126—37 |
| 2,978,567 | 4/61 | Crispell et al. | 126—37 |
| 2,979,053 | 4/61 | Crispell et al. | 126—194 |

FOREIGN PATENTS 833,849    3/52    Germany.

JAMES W. WESTHAVER, *Primary Examiner.*

FREDERICK L. MATTESON, Jr., *Examiner.*